United States Patent
Elsom et al.

(10) Patent No.: US 10,834,940 B2
(45) Date of Patent: Nov. 17, 2020

(54) INTEGRATED MOTOR DRIVE SYSTEM FOR SOFT SERVE DISPENSER

(71) Applicant: H.C. Duke & Son, LLC, East Moline, IL (US)

(72) Inventors: Kyle B. Elsom, Le Claire, IA (US); Lex Greenway, Rock Island, IL (US); James A. Quandt, East Moline, IL (US); Mark L. Davis, East Moline, IL (US)

(73) Assignee: H.C. Duke & Son, LLC, East Moline, IL (US)

( * ) Notice: Subject to any disclaimer, the term of this patent is extended or adjusted under 35 U.S.C. 154(b) by 0 days.

(21) Appl. No.: 15/598,645

(22) Filed: May 18, 2017

(65) Prior Publication Data

US 2017/0332660 A1 Nov. 23, 2017

Related U.S. Application Data

(60) Provisional application No. 62/338,047, filed on May 18, 2016.

(51) Int. Cl.
*A23G 9/28* (2006.01)
*A23G 9/22* (2006.01)

(52) U.S. Cl.
CPC .............. *A23G 9/282* (2013.01); *A23G 9/22* (2013.01); *A23G 9/222* (2013.01); *A23G 9/228* (2013.01); *A23G 9/28* (2013.01); *A23G 9/281* (2013.01)

(58) Field of Classification Search
CPC ......... H04N 21/42615; H04N 21/4347; H04N 7/088; H04N 21/4263; H04N 21/437;
(Continued)

(56) References Cited

U.S. PATENT DOCUMENTS 2,191,344 A * 2/1940 Erickson .................. A23G 9/16
165/168
5,072,859 A 12/1991 Wiley et al.
(Continued)

FOREIGN PATENT DOCUMENTS

JP 2012144267 A 8/2012
JP 2012144269 A 8/2012
JP 5724611 B2 5/2015

OTHER PUBLICATIONS

Extended European Search Report for EP17171764.8, dated Sep. 18, 2017.

*Primary Examiner* — Donnell A Long
(74) *Attorney, Agent, or Firm* — Dinsmore & Shohl LLP

(57) ABSTRACT

A frozen confection dispensing apparatus includes a freezer section having a base product. A dispensing section is connected to the freezer section. The dispensing section includes a mixing cylinder and a plunger movably positioned within the mixing cylinder, the mixing cylinder including at least one injection port. A flavoring section includes a plurality of flavor syrups connected to a specified injection port. A stepper motor is connected to the plunger and moves the plunger within the mixing cylinder. A control mechanism is connected with the stepper motor and syrup pump selectively moving the plunger wherein a syrup dispense rate and timing is sequenced by the control mechanism with the stepper motor driven plunger wherein mixing of the base product and flavor syrup is precisely controlled.

20 Claims, 12 Drawing Sheets

(58) Field of Classification Search
CPC .......... H04N 21/4104; H04N 21/4307; H04N 21/4332; H04N 21/4325; H04N 21/4122; H04N 21/4334; H04N 21/43615; H04N 21/4147; H04N 21/4348; H04N 21/4344; H04N 21/4385
USPC .............................................. 222/145.2, 148
See application file for complete search history.

(56) References Cited

U.S. PATENT DOCUMENTS

| | | | |
|---|---|---|---|
| 2001/0035016 A1* | 11/2001 | Weber .................... | A23G 9/045 62/210 |
| 2005/0064077 A1 | 3/2005 | Harra | |
| 2008/0073376 A1 | 3/2008 | Gist et al. | |
| 2010/0013949 A1 | 1/2010 | Miyamoto | |
| 2011/0023511 A1* | 2/2011 | Lee ...................... | B67D 1/0857 62/178 |
| 2012/0087203 A1 | 4/2012 | Williams et al. | |
| 2015/0102062 A1* | 4/2015 | Mosimann ............ | A47J 31/467 222/129.1 |
| 2016/0176693 A1* | 6/2016 | Lawler .................... | B67D 1/07 222/148 |

\* cited by examiner

| Plunger Open | 1359 | (0-2598) |

Plunger Calibration Value

| Plunger Open Speed | 50% | (0-100%) |

| Plunger Close Speed | 50% | (0-100%) |

Jog Plunger Up    Jog Plunger Down

Zero Plunger

Accept

Exit

*Fig-17*

Open

| Syrup Pump Open Delay | 0.5s |

Open/Close Routine Value

| Plunger Open Delay | 0.5s |

| Pump Delay | 0.5s |

Close

| Plunger Close Delay | 0.5s |

| Syrup Pump Delay | 0.5s |

| Syrup Pump Reverse | 2rev |

Accept

Exit

INTEGRATED MOTOR DRIVE SYSTEM FOR SOFT SERVE DISPENSER

CROSS-REFERENCE TO RELATED APPLICATIONS

This application claims priority of U.S. Provisional Application No. 62/338,047 filed May 18, 2016 the contents of which are incorporated herein by reference.

FIELD OF THE INVENTION

The invention relates to a frozen confection dispensing apparatus and with more particularity to a frozen confection dispensing apparatus including multiple flavors mixed at the point of dispense.

BACKGROUND OF THE INVENTION

Various soft serve systems have been developed that allow the mixing of a soft serve base product with various syrups to provide multiple flavors from a single soft serve machine. However, at the conclusion of a dispensing cycle a certain amount of blended product remains in a mix chamber. When a new product is selected the preceding portion will have this remnant of the previous flavor dispensed with the current selected flavor. This carryover of a flavor is undesirable as a consumer may have a mixture of product flavors versus a single flavor that has been selected.

Current prior art systems may utilize a rinse cycle between each dispensing cycle in order to eliminate the carryover of flavors. However, such systems create a break or lag interval for a dispensing sequence and require disposal of the rinse product. Typically such prior art systems have required the use of a trained operator to facilitate these functions limiting the application for a self-serve environment.

There is therefore a need in the art for a soft serve dispensing mechanism that utilizes a combination of flavors in a single machine without the need for a trained operator. A self-serve soft dispensing machine may be utilized in various locations to allow customers to select a desired flavor without the need for a dedicated employee or operator of the machine.

There is a further need in the art for an automated dispensing machine that will limit the amount of carryover between selected flavors.

SUMMARY OF THE INVENTION

In one aspect, there is disclosed a frozen confection dispensing apparatus that includes a freezer section having a base product. A dispensing section is connected to the freezer section. The dispensing section includes a mixing cylinder and a plunger movably positioned within the mixing cylinder, the mixing cylinder including at least one injection port. A user interface is provided allowing a user to select a desired flavor. A flavoring section includes a plurality of flavor syrups connected to pumps that selectively pump syrups to a specified injection port. A mixing motor assembly including a motor is attached to a shaft. The shaft terminates at a terminal end in the mixing cylinder. The terminal end includes a mixing blade attached thereon. A stepper motor is connected to the plunger and moves the plunger within the mixing cylinder. A control mechanism is connected with the stepper motor and syrup pump selectively moving the plunger wherein a syrup dispense rate and timing is sequenced by the control mechanism with the stepper motor driven plunger wherein mixing of the base product and flavor syrup is precisely controlled improving a product quality at a beginning and end of a dispense cycle eliminating carryover of flavor syrup during a dispensing cycle.

In another aspect, there is disclosed a frozen confection dispensing apparatus that includes a freezer section having a base product. A dispensing section is connected to the freezer section. The dispensing section includes a mixing cylinder and a plunger movably positioned within the mixing cylinder, the mixing cylinder including at least one injection port. A flavoring section includes a plurality of flavor syrups connected to a specified injection port. A stepper motor is connected to the plunger and moves the plunger within the mixing cylinder. A control mechanism is connected with the stepper motor and syrup pump selectively moving the plunger wherein a syrup dispense rate and timing is sequenced by the control mechanism with the stepper motor driven plunger wherein mixing of the base product and flavor syrup is precisely controlled.

In a further aspect, there is disclosed a frozen confection dispensing apparatus that includes a freezer section having a base product. A dispensing section is connected to the freezer section. The dispensing section includes a mixing cylinder and a plunger movably positioned within the mixing cylinder, the mixing cylinder including at least one injection port. A flavoring section includes a plurality of flavor syrups connected to a specified injection port. A stepper motor is connected to the plunger and moves the plunger within the mixing cylinder. A control mechanism is connected with the stepper motor and syrup pump selectively moving the plunger wherein a syrup dispense rate and timing is sequenced by the control mechanism with the stepper motor driven plunger wherein mixing of the base product and flavor syrup is precisely controlled. The dispensing mechanism includes an automated rinse structure having a retractable curtain coupled to a rinse motor that rotates the retractable curtain around the dispensing section.

BRIEF DESCRIPTION OF THE DRAWINGS

FIG. 17 is a graphical depiction of a user interface displaying a plunger calibration screen;

FIG. 18 is a graphical depiction of a user interface displaying open and closing values and pump operation values;

FIG. 19 is a graphical depiction of a user interface displaying rinse cycle or system parameters;

FIG. 20 is a graphical depiction of a user interface wherein graphics may be selected for the various flavors;

DETAILED DESCRIPTION OF THE INVENTION

Figure 1:
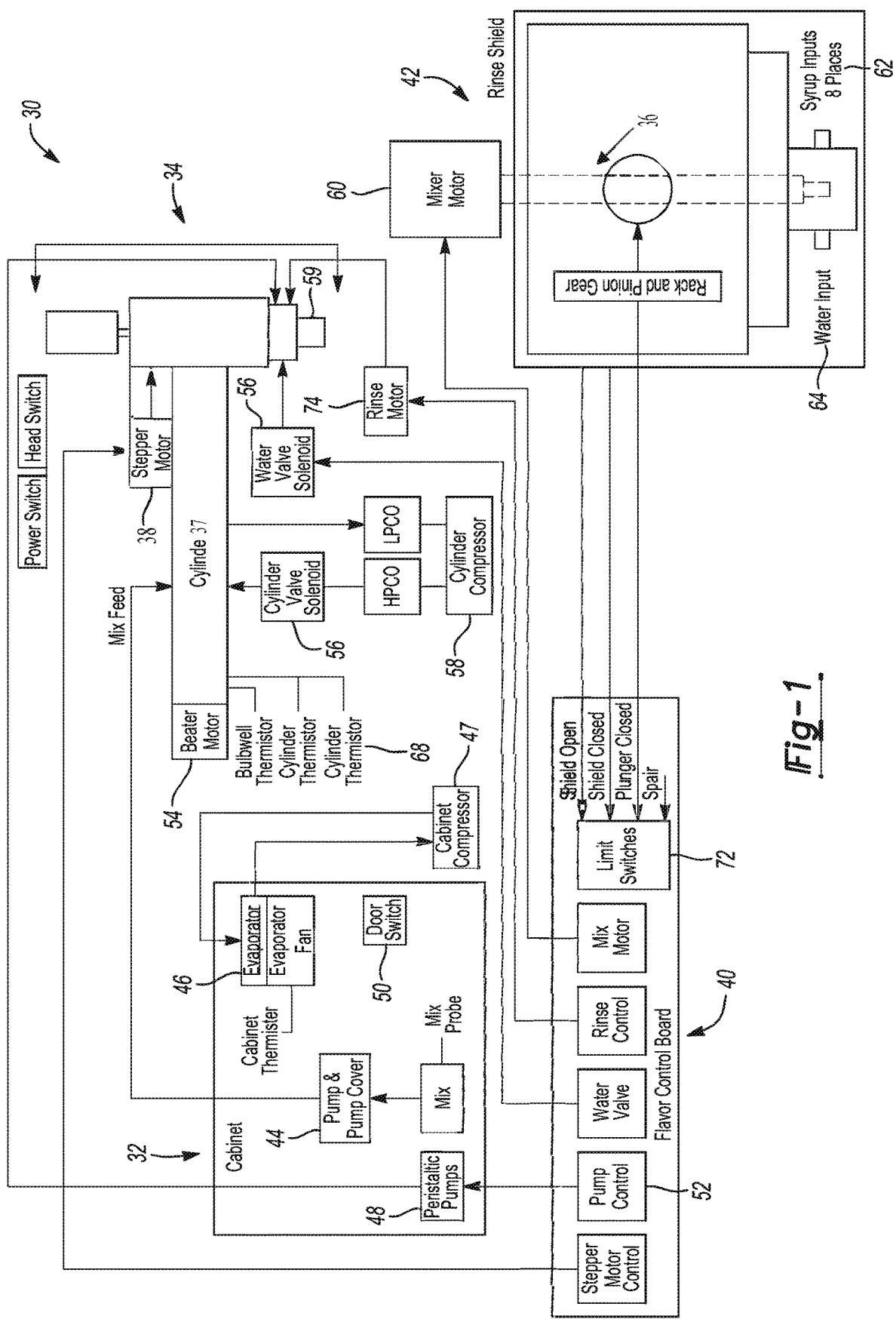
FIG. 1 is a flow diagram of an integrated motor drive system for a soft serve dispenser.

Referring to FIG. 1, there is shown a diagram depicting the various portions of the dispensing apparatus 30. In one aspect, the dispensing apparatus 30 includes a freezer section and cabinet 32 that cools a base product for dispensing as a soft serve ice cream. The apparatus also includes a dispensing section 34 which includes a mixing cylinder 36 and stepper motor 38, as will be described in more detail below. The apparatus also includes control systems 40 for regulating mixing a desired flavor in the cylinder 36 as well as a rinse structure 42 for completing a rinse cycle at a desired time.

The cabinet section 32 includes a pump 44, a refrigeration system for cooling the cabinet, including evaporator 46, compressor 47, flavor pumps for delivering the syrup flavors 48, and various switches 50 for regulating the syrups and base products. The cabinet section maintains the base product and syrup flavors at the required storage temperatures. The cabinet section 32 is linked with several of the control structures 40 including the pump control 52.

The dispensing section 34 includes the mixing cylinder 36, a beater motor 54, solenoid control valves 56, and a stepper motor 38 as well as compressors 58 for moving a base product within the freezing cylinder 37 and freezing the product to the desired consistency. In one aspect, the stepper motor 38 moves and regulates the plunge assembly 59 for controlling the dispensing of a product as will be discussed in more detail below.

Figure 2:
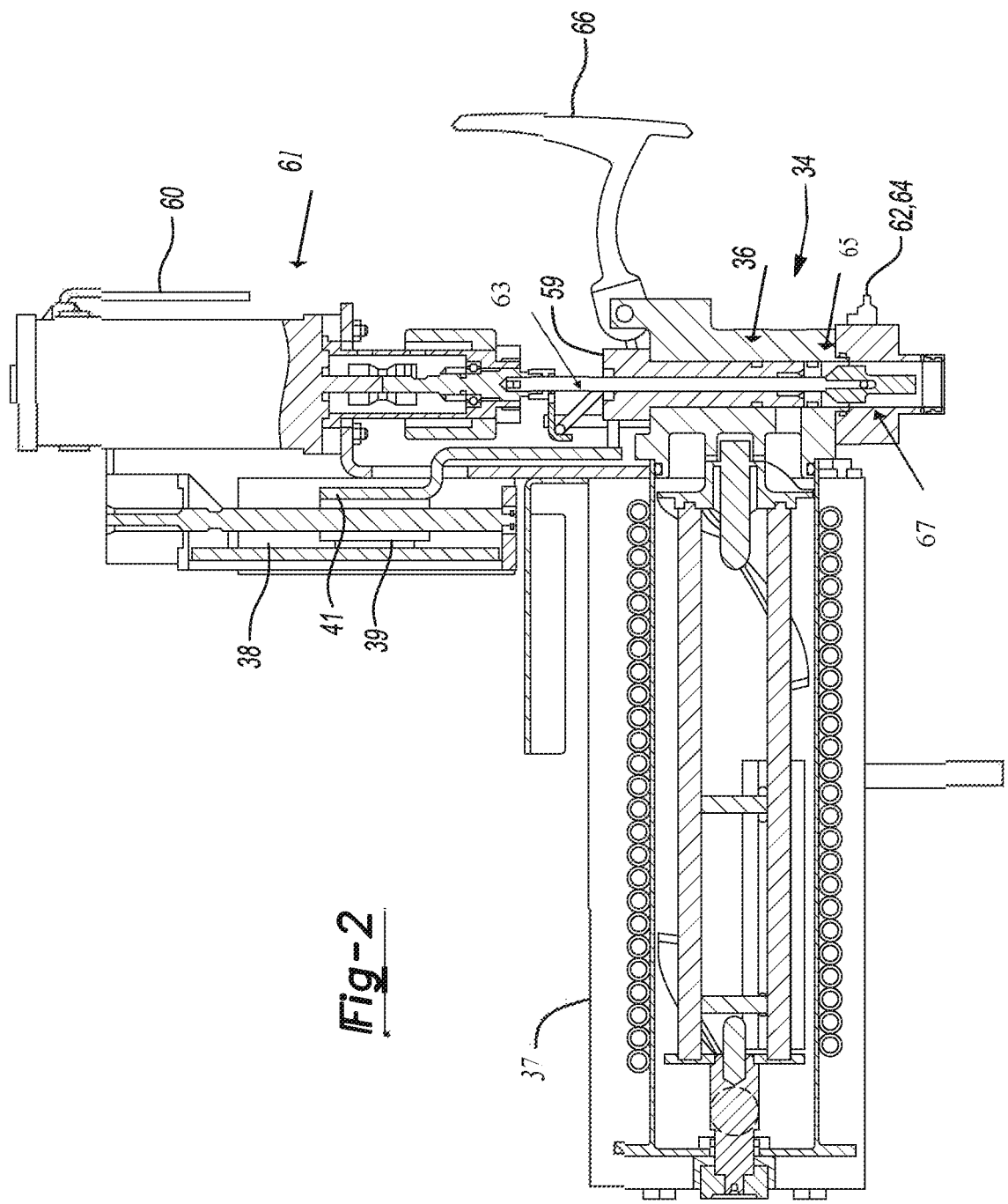
FIG. 2 is a partial perspective view of a dispensing mechanism including a freeze cylinder and an integrated motor drive system.

The dispensing section 34 also includes a mixing motor assembly 61 including a mixer motor 60 that is coupled with the control mechanism 40 and also various inputs such as a flavor syrup input or injection port 62 and a water input 64. Referring to FIG. 2, the mixing motor assembly 61 includes the mixing motor 60 attached to a shaft 63. The shaft 63 terminates at a terminal end 65 in the mixing cylinder 36. The terminal end 65 includes a mixing blade 67 attached thereon. All of these sections are linked to various portions of the control section 40 as depicted in FIG. 1.

Referring to FIG. 2, there is shown a partial perspective view of a dispensing apparatus 10 that includes a stepper motor 38 driven plunger assembly 59 that is combined with a controller 40 to regulate the flow of a soft serve product. The plunger 59 disposed within the cylinder 36 is driven using the stepper motor 38 which moves a driven member 39 and is activated by a signal from a dispensing lever arm or dispense button 66. The driven member 39 is connected to the plunger 59 by a bracket 41 in the depicted embodiment. The motor driven plunger 59 allows the timing and precise portioning of a soft serve product with injected syrup 62 to optimize the blending process. In one aspect, the freezing cylinder 37 may include a cylinder pressure feedback loop 68 as shown in FIG. 1 that is coupled with the controller 40 such that the opening position of the dispensing mechanism can be regulated based on a measured cylinder pressure to maintain a precise flow of a soft serve product so that the mixing ratios of the flavors and base product can be maintained throughout a dispensing cycle.

Figure 3:
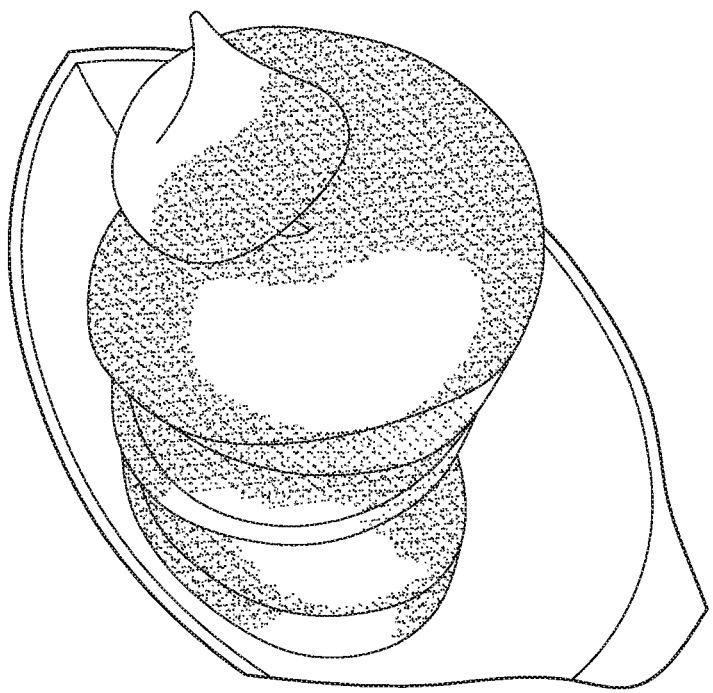
FIG. 3 is a graphical depiction of a dispensed product including a carryover of a base product.
Figure 4:
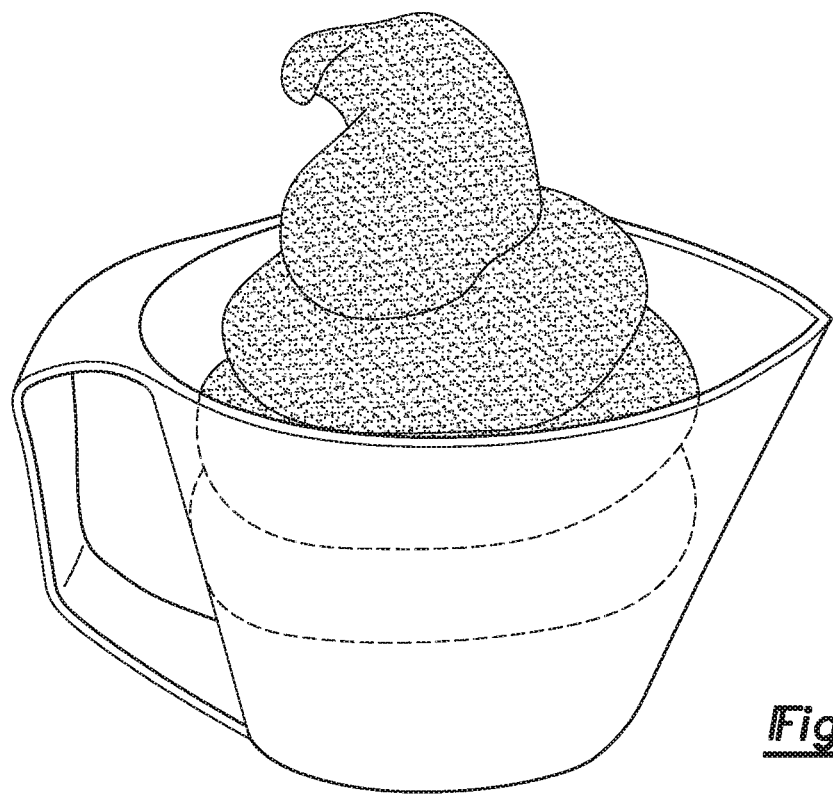
FIG. 4 is a graphical depiction of a soft serve product having a homogeneous consistency.

The stepper motor 38 driven plunger assembly 59 may be utilized to vary the timing at the initiation of a dispensing cycle so that the base product flow may be delayed a predetermined amount of time to allow for a pre-injection of a selected flavor or syrup prior to initiation of the base product flow such that the product dispensed at the start of the cycle is homogeneous and does not include only a base product. The stepper motor 38 driven plunger assembly 59 may also be utilized to vary the product flow at the end of the dispensing cycle such that the syrup flow is terminated for a predetermined amount of time while the base product is allowed to flow to flush out any flavor and eliminating potential carryover of a base product as shown in FIG. 3 as is common with prior art dispensing systems. The dispensed product of FIG. 4 details a uniform dispensed product as produced by the dispensing apparatus of the present application.

In one aspect, the control mechanism 40 may reverse the syrup pump motor once the close routine has been initiated. In this manner, a suction is created in the syrup supply line such that additional flavor is not siphoned into the mix stream during the dispensing process. This would eliminate potential carryover of flavors between dispensing cycles.

Additionally, the plunger speed may be regulated such that siphoning introduced by the plunger 59 during the dispensing operation during a closing routine is reduced.

In order to maintain a minimum carryover of flavors between dispensing cycles a top-off routine may be utilized for precise control over the sequence, rate, and timing of the base product dispense, the injection of a flavor syrup, and the initiation of the blending process to produce a desired homogeneous product. As described above, the use of a stepper motor drive 38 with the plunger 59 provides an automated or controlled movement of the plunger 59 such that the base product dispense rate and timing is achieved. In one aspect, the stepper motor 38 is electronically coupled to the controller 40 such that once a dispense sequence is initiated the controller may regulate the flow of the base product by varying the speed and total travel of the plunger 59 during the dispense cycle. The syrup dispense rate and timing is sequenced by the control mechanism with the stepper driven plunger so that the mixing can be precisely controlled to improve the product quality at the beginning and end of a dispense cycle and eliminate carryover of flavors during a dispensing cycle.

Figure 5:
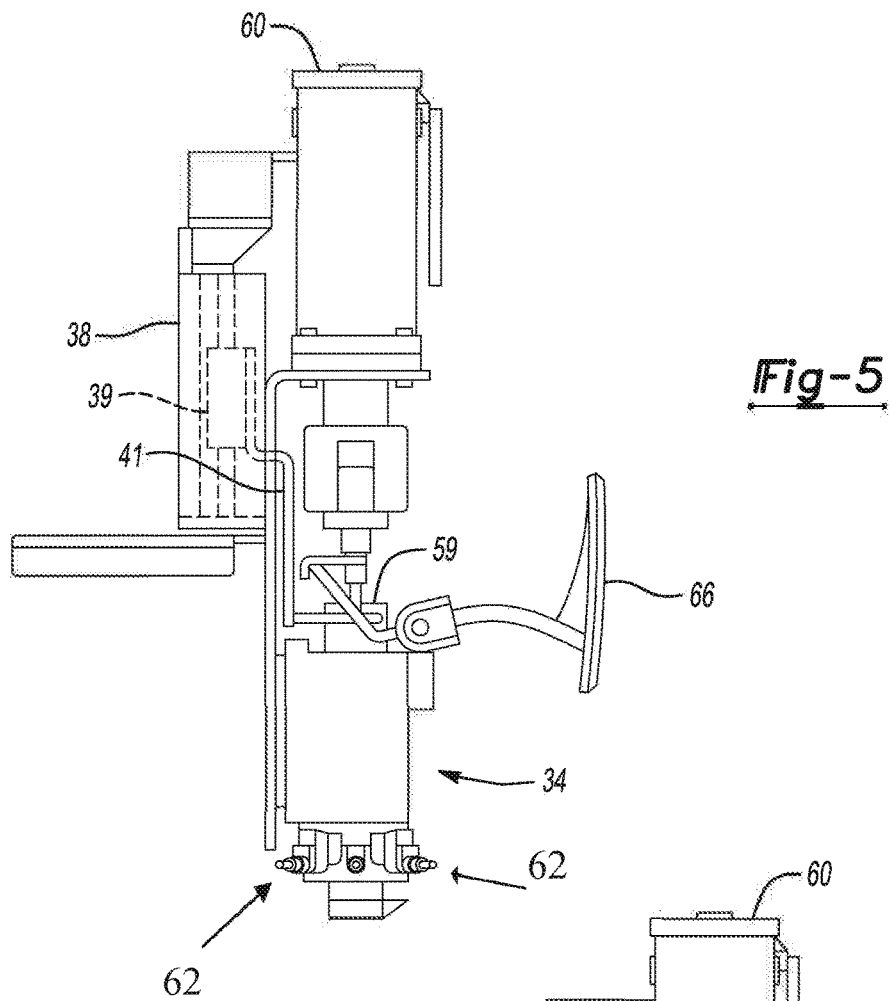
FIG. 5 is a partial perspective view of a dispensing mechanism at a start of a dispense cycle.
Figure 6:
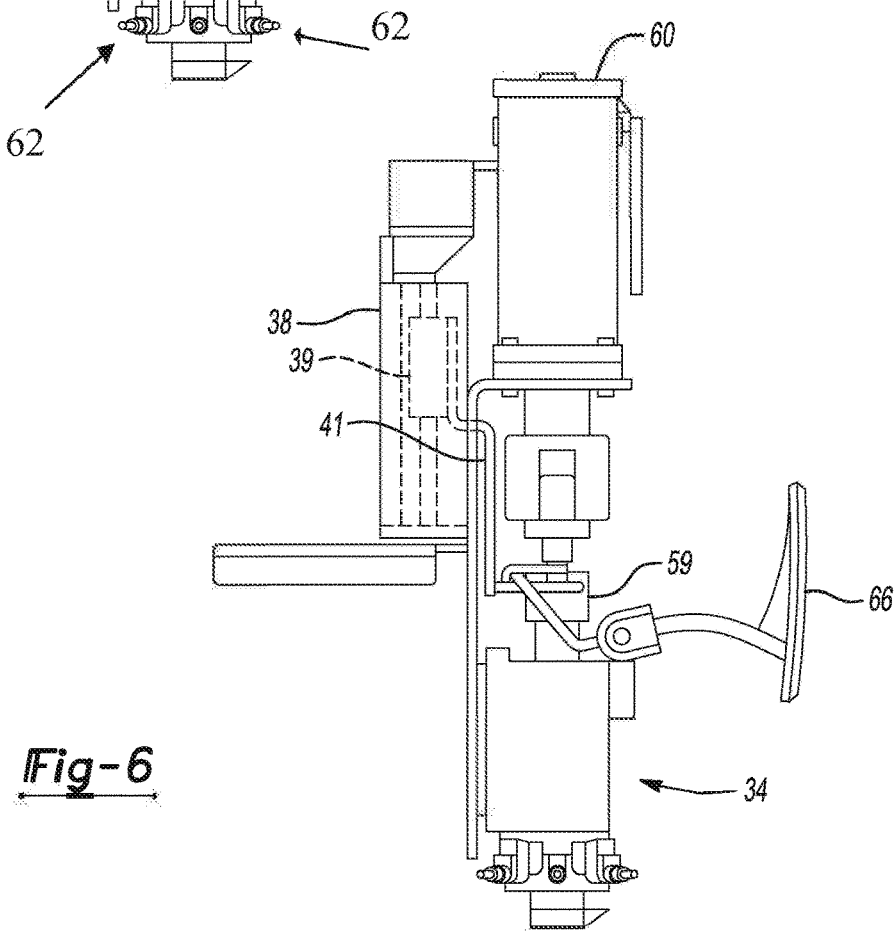
FIG. 6 is a graphical depiction of the dispensing mechanism showing travel during a dispensing cycle.
Figure 7:
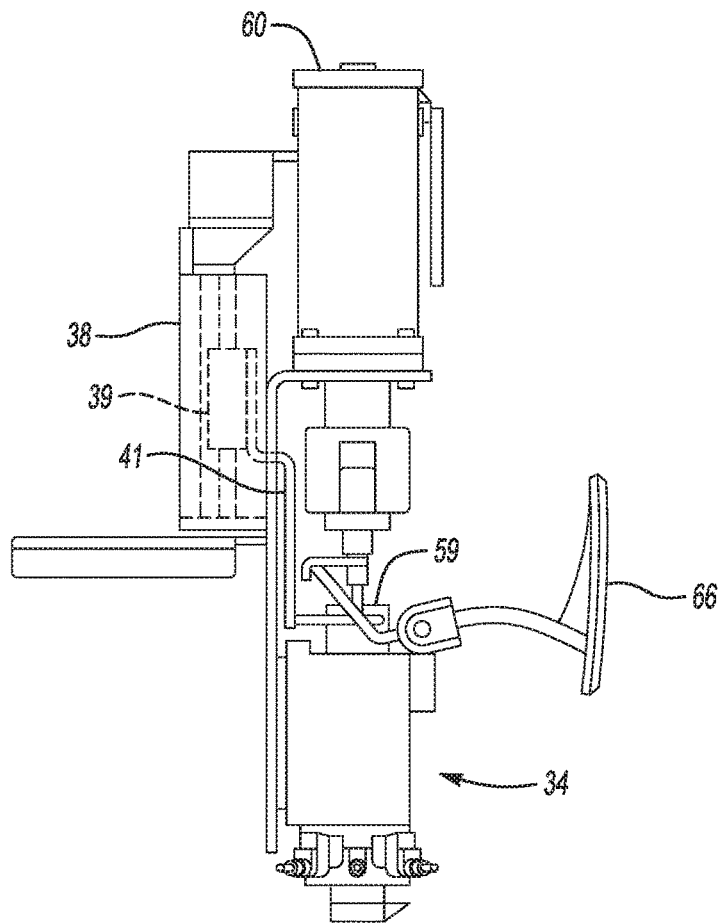
FIG. 7 is a graphical depiction of the dispensing mechanism showing the travel at the end of a dispensing cycle.

Referring to FIGS. 5-7, there is shown graphical images of the dispensing mechanism during a dispense operation. To initiate a dispensing operation, the controller 40 may turn on the beater motor 54 and mix feed pump 44, followed by opening of the solenoid valve 56 and actuating the compressor 58 to initiate the refrigeration cycle. The syrup pump 48 and a plunger delay are keyed to the initiation of the mixer and beater motors 60, 54 to begin the blending process. Following, the syrup pump 48 may be turned on with various control signals including a syrup pump open delay and a calculated rate of syrup dispense through the syrup pump 48 such that a desired homogeneous mixture without carryover is achieved. Next, the control system 40 will wait for the plunger delay and operate a plunger at a specified plunger operating speed. As the product is dispensed, the control system will next initiate a turn off sequence once a switch closure is detected, or the dispense times out if a portion control method of dispense is utilized.

In the turn off sequence, the syrup pump 48 may be controlled such that the syrup pump is closed at a desired rate. Additionally, the syrup pump 48 may be operated in reverse to siphon any flavor within a dispensing syrup line and prevent siphoning of the flavor syrup into the mix cylinder 36. Next, the plunger 59 is closed at a specified speed and delay which may be regulated according to desired mix profiles. Next, the mix motor 60 and compressor 58 and solenoid valve 56 may be turned off followed by turning off of the beater motor 38.

Figure 8:
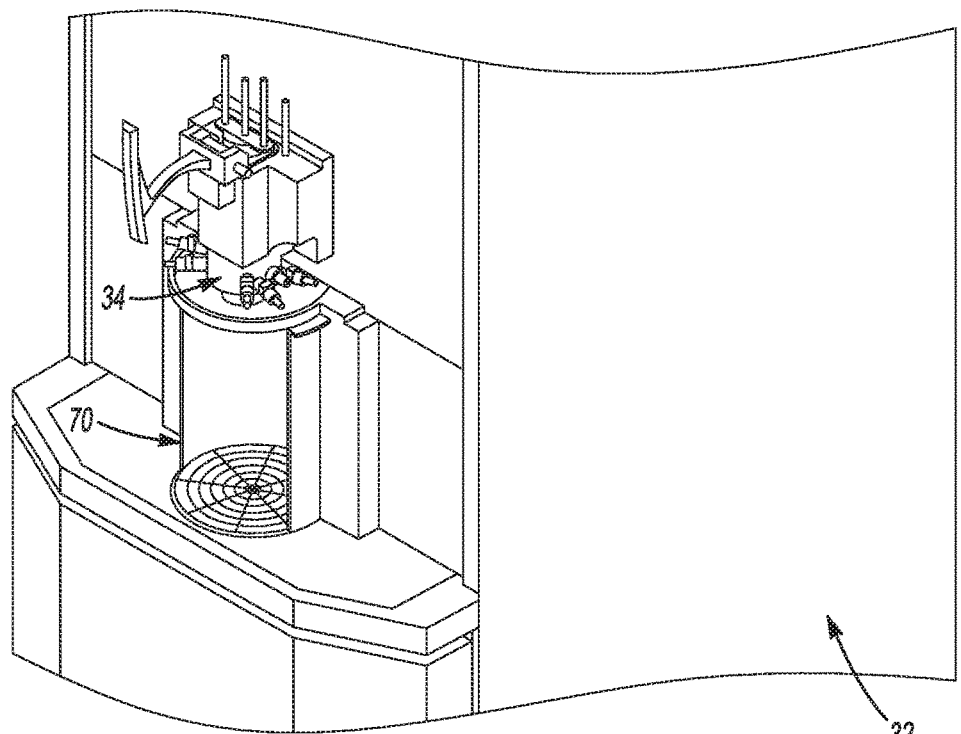
FIG. 8 is a partial perspective view of a soft serve dispensing machine including a rinse structure at a beginning of a rinse cycle.
Figure 9:
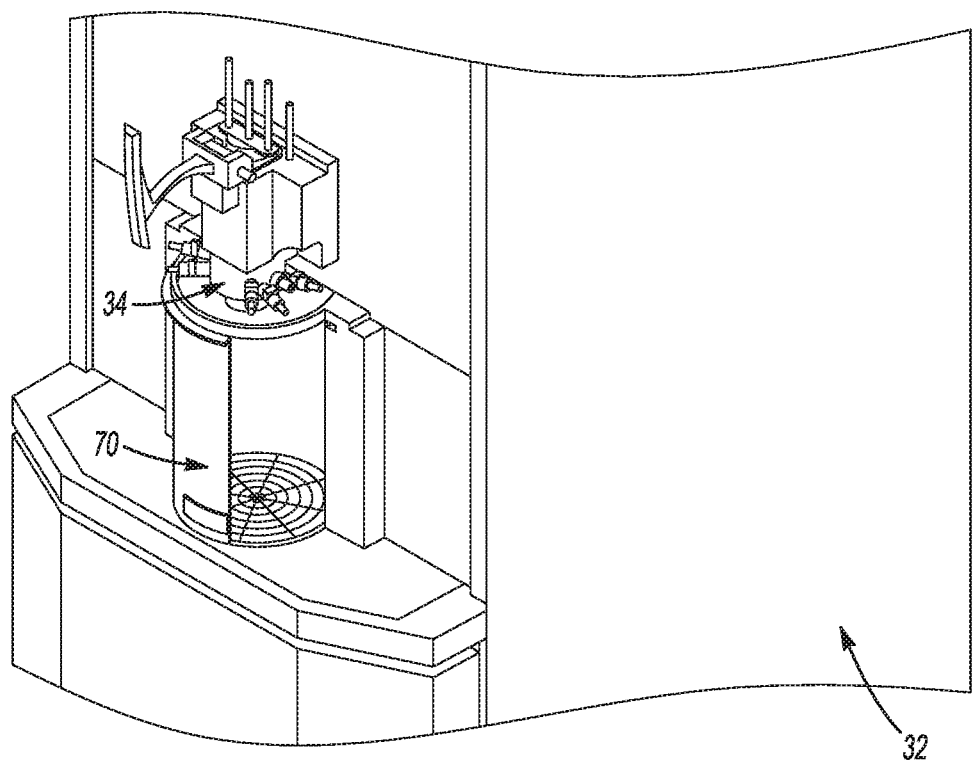
FIG. 9 is a graphical perspective view of a rinse cycle structure during a rinse cycle.
Figure 10:
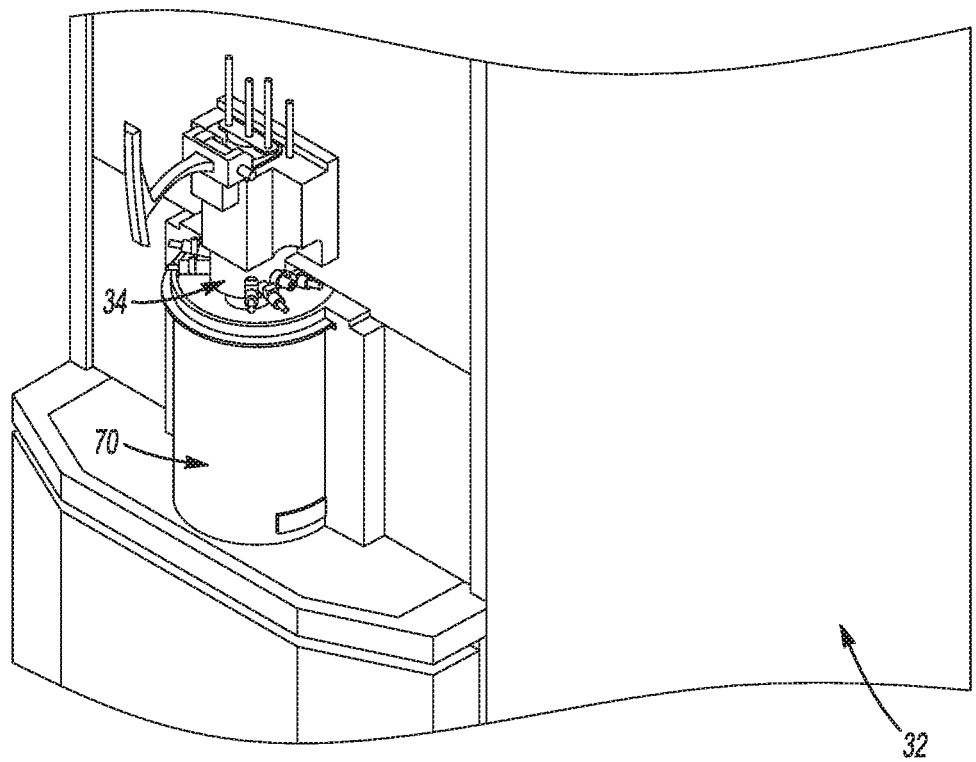
FIG. 10 is a graphical perspective view of a rinse structure near a conclusion of the rinse cycle.

Referring to FIGS. 8-10, there is depicted a rinse cycle structure 42 and mechanism at various portions during a rinse cycle.

As described above, the dispensing mechanism may include an automated rinse structure 42. In one aspect, the cleaning function may be utilized to remove remnants in the mix cylinder 36 after a dispensing cycle has been not performed for a specified time period. In one aspect, the rinse structure includes a retractable curtain 70 that rotates around the dispensing section 34. The rinse remnants may be directed to a drain with the retractable curtain 70 in place to be utilized with a self-serve piece of equipment. As can be seen in the figures, once rinse cycle is initiated the curtain closes about the dispensing section such that water is flushed through the mixing cylinder 26 removing potential remnants and directing it to the drain.

To initiate a rinse sequence, a rinse sequence counter may be initiated. During this time period the rinse curtain 70 is moved as described above and a switch 72 monitors full engagement of the rinse curtain 70. A signal is sent to turn on the rinse motor 74 which moves the curtain into position such that a close limit switch 72 signals full engagement of the rinse curtain followed by powering down the rinse motor 74. Next, a water valve 56 and mix motor 60 is opened and initiated for a desired time period flushing the dispensing cylinder 36. Next, the water valve 56 is closed and the mix motor 60 is run for a desired time period. Following, the rinse motor 74 is run in reverse to open the curtain 70 wherein an open limit switch 72 designates a fully open curtain 70 such that the rinse motor 74 may then be turned off. The dispensing mechanism 30 is now ready to dispense a desired soft serve product.

Figure 11:
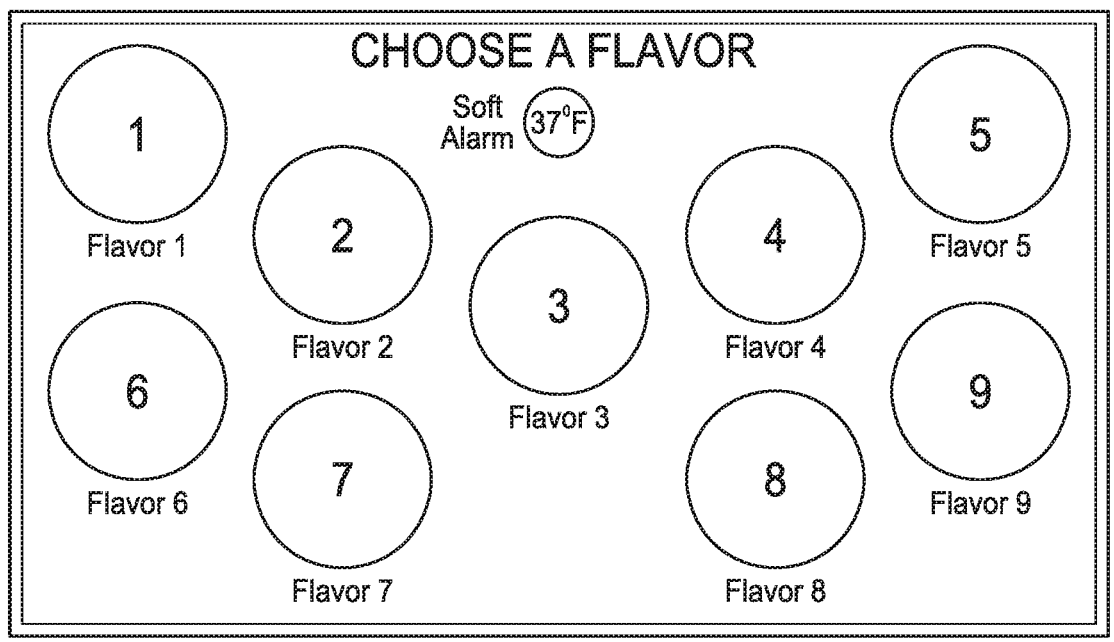
FIG. 11 is a graphical depiction of a user interface showing the selection of a flavor.
Figure 12:
FIG. 12 is a graphical depiction of a user interface showing the selected flavor and displaying instructions for dispensing a soft serve product.
Figure 13:
FIG. 13 is a graphical depiction of a user interface at a conclusion of a dispensing cycle.

As described above, a user interface may be utilized to allow for a self-serve dispense operation. Referring to FIGS. 11-13, there are shown various user interfaces for dispensing a product. As shown in FIG. 11, a user may select a desired flavor from multiple flavors. Additionally, once the flavor has been selected instructions may be displayed to position a cup or cone under the nozzle followed by actuation of the handle to initiate the dispensing operation, as described above. After the product has been dispensed, the user interface may display a message indicating completion of the operation as shown in FIG. 13.

Figure 14:
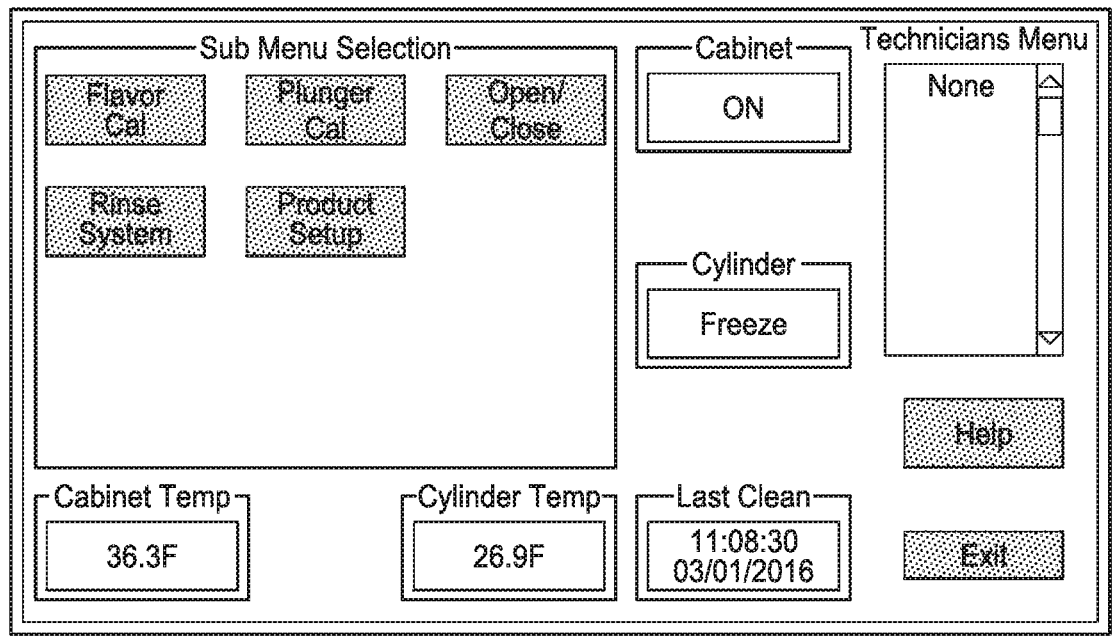
FIG. 14 is a graphical depiction of a user interface displaying a technical menu wherein various system settings may be monitored or adjusted.
Figure 15:
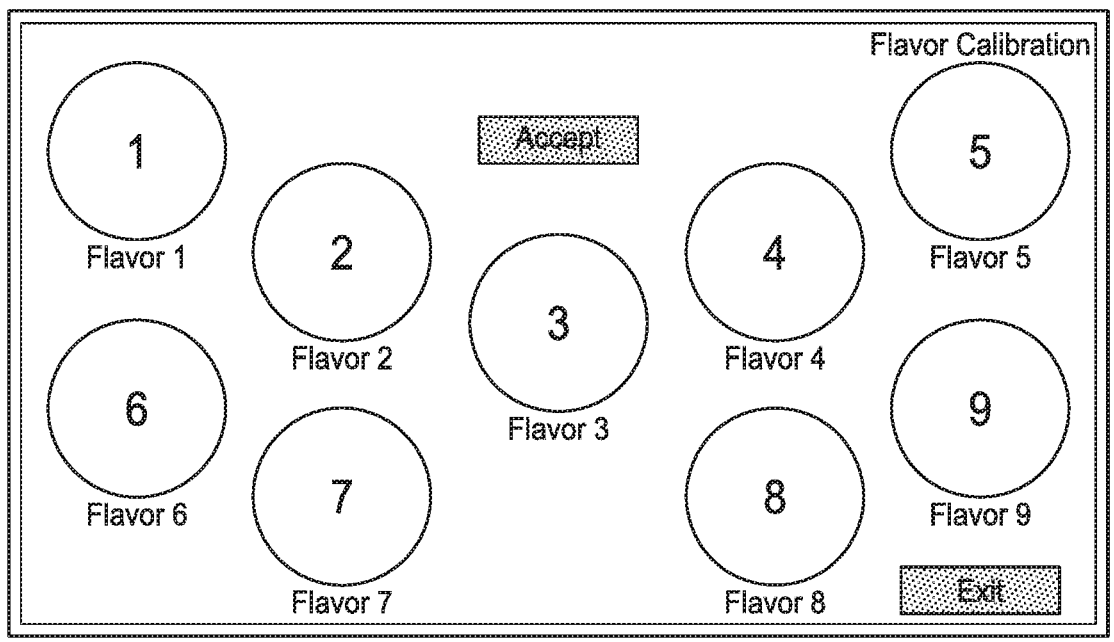
FIG. 15 is a graphical depiction of a user interface displaying a flavor calibration screen.
Figure 16:
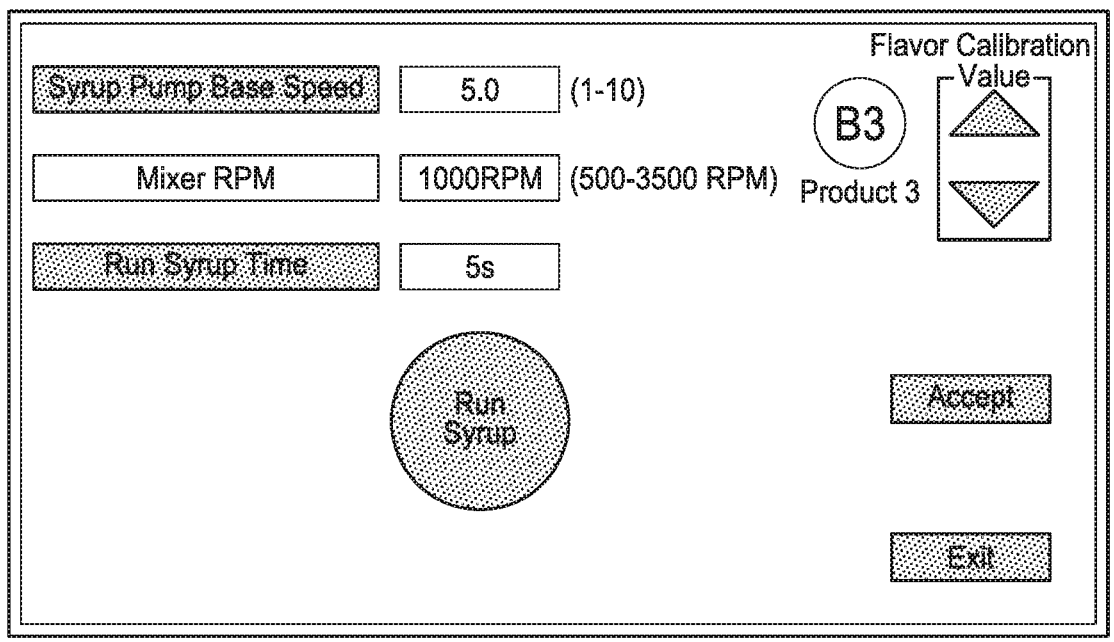
FIG. 16 is a graphical depiction of a flavor calibration subscreen of FIG. 15.

The user interface may also include portions for control of the various parameters of the dispensing mechanism and should be operated by the owner and operator of the machine rather than a customer. In one aspect, the user interface may include various calibration screens and controls as shown in FIG. 14. Calibration screens may include a flavor calibration of FIGS. 15 and 16 with various parameters shown including the pump base speed for the syrup as well as a syrup run time. Additionally, as displayed in FIG. 17, the plunger speed may also be regulated by input of various parameters such as the time of the plunger opening, the speed of the opening, as well as other parameters.

Additionally, the open and close routine associated with operation of the dispensing as described above may be controlled and specified in a user interface as shown in FIG. 18. Various parameters such as the syrup pump open delay, plunger open delay, pump delay for both opening and closing of the systems may be specified. In this manner, carryover of a base or previous flavor profile may be minimized.

Figures 19, 20:
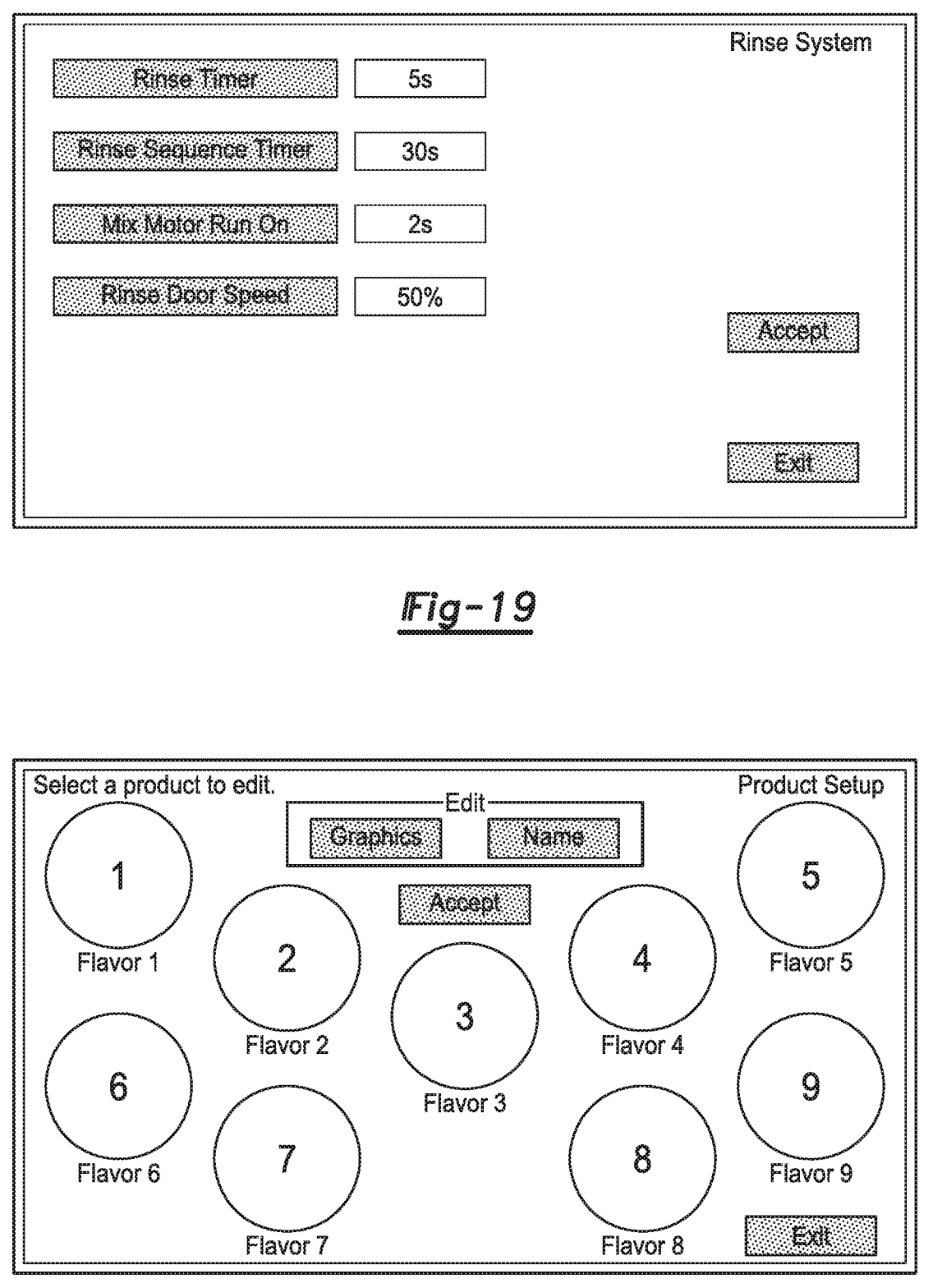

Additionally, the rinse cycle routine may be controlled as shown in FIG. 19 by entering various parameters such as a rinse timer, rinse sequence timer, mix motor run time, and a rinse door speed. In this manner the rinse cycle parameters may be controlled by an operator of the dispensing apparatus.

Figure 21:
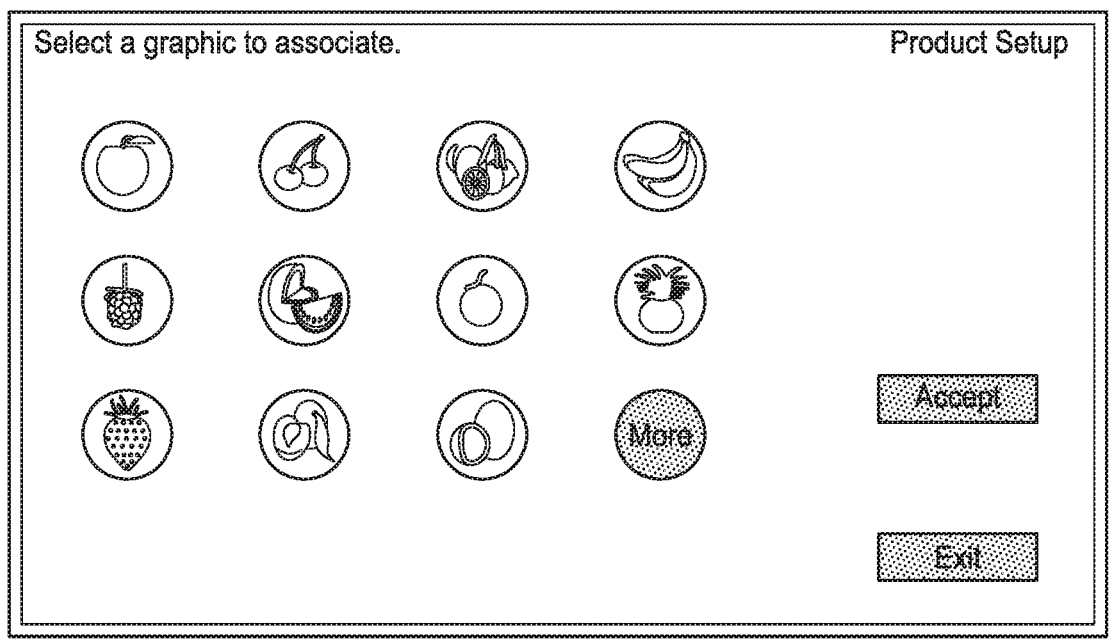
FIG. 21 is a graphical depiction of a user interface displaying icons representing a flavor.
Figure 22:
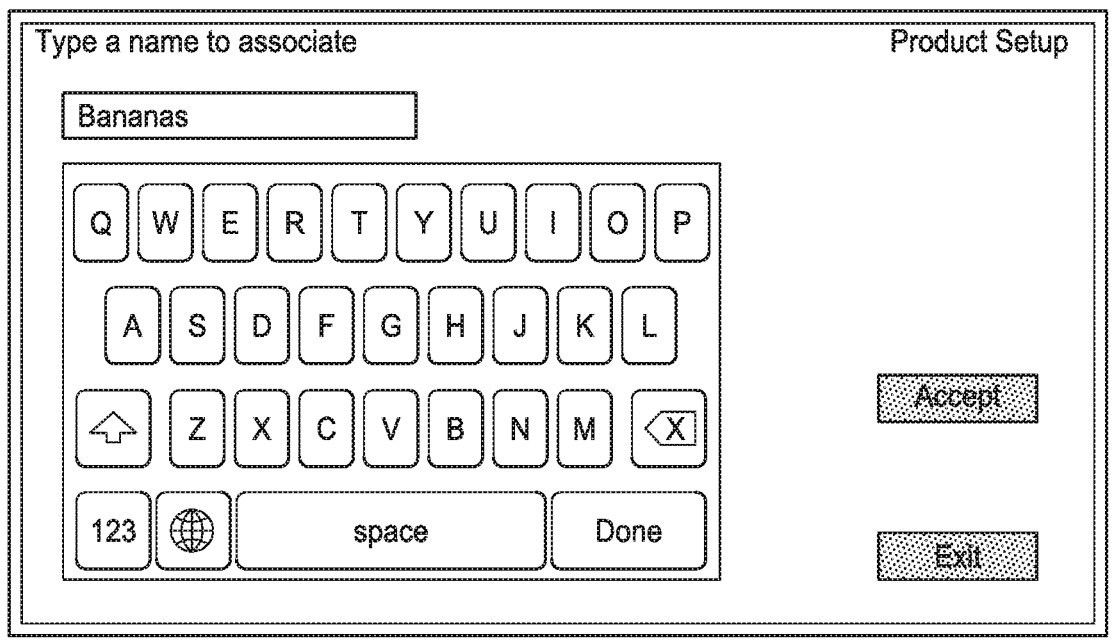
FIG. 22 is a graphical interface wherein names may be assigned to various of the flavors.

Referring to FIGS. 20-22, the operator may also specify various flavor profiles including a name and a graphical icon to display the flavors that may be selected by a customer.

The utilization of a stepper motor drive mechanism 38 with a dispenser plunger 59 in conjunction with the control mechanism as described above allows for elimination of potential product carryovers for flavors for a self-serve soft serve dispense mechanism.

We claim:

1. A frozen confection dispensing apparatus comprising:
a freezer section including a base product;
a dispensing section connected to the freezer section, the dispensing section including a mixing cylinder and a plunger movably positioned within the mixing cylinder, the mixing cylinder including at least one injection port;
a user interface allowing a user to select a desired flavor;
a plurality of flavor syrups linked with a syrup pump and connected to the at least one injection port;
a mixing motor assembly including a motor attached to a shaft, the shaft terminating at a terminal end in the mixing cylinder, the terminal end including a mixing blade attached thereon;
a stepper motor connected to the plunger and moving the plunger within the mixing cylinder;
a control mechanism connected with the stepper motor and syrup pump selectively moving the plunger wherein a syrup dispense rate and timing is sequenced by the control mechanism with the stepper motor driven plunger wherein mixing of the base product and flavor syrup within the mixing cylinder is precisely controlled improving a product quality at a beginning and end of a dispense cycle eliminating carryover of flavor syrup during a dispensing cycle.

2. The frozen confection dispensing apparatus of claim 1 wherein the mixing cylinder includes a cylinder pressure feedback loop coupled with the controller wherein an opening position of a dispensing mechanism is regulated in relation to a measured cylinder pressure to maintain a precise flow of the base product wherein mixing ratios of the flavor syrup and base product are maintained throughout a dispensing cycle.

3. The frozen confection dispensing apparatus of claim 1 wherein the stepper motor varies the timing at an initiation of a dispensing cycle wherein base product flow is delayed a predetermined amount of time to allow for a pre-injection of a selected flavor syrup into the mixing cylinder prior to initiation of the base product flow such that the product dispensed at the start of the cycle is homogeneous.

4. The frozen confection dispensing apparatus of claim 1 wherein the stepper motor varies product flow at an end of the dispensing cycle such that the syrup flow is terminated for a predetermined amount of time while the base product is allowed to flow eliminating potential carryover.

5. The frozen confection dispensing apparatus of claim 1 wherein the control mechanism reverses the syrup pump in response to a close routine.

6. The frozen confection dispensing apparatus of claim 1 wherein the plunger speed is regulated such that siphoning introduced by the plunger during the dispensing operation during a closing routine is reduced.

7. The frozen confection dispensing apparatus of claim 1 including a beater motor, solenoid valve and mix feed pump linked with the mixing cylinder and selectively moving the base product within the mixing cylinder.

8. The frozen confection dispensing apparatus of claim 7 wherein actuation of the syrup pump and a plunger delay are keyed to initiation of mixer and beater motors to begin a blending process.

9. The frozen confection dispensing apparatus of claim 1 including an automated rinse structure having a retractable curtain coupled to a rinse motor that rotates the retractable curtain around the dispensing section.

10. The frozen confection dispensing apparatus of claim 9 wherein the rinse curtain includes a switch that monitors full engagement of the rinse curtain.

11. The frozen confection dispensing apparatus of claim 9 including a drain disposed in the dispensing section.

12. The frozen confection dispensing apparatus of claim 1 including a water valve coupled to the mixing cylinder wherein water is introduced into the mixing cylinder during a rinse cycle and wherein the mixing motor is operated for a desired time period flushing the mixing cylinder.

13. The frozen confection dispensing apparatus of claim 1 wherein the user interface includes displayed instructions to position a cup or cone under the nozzle before the dispensing operation.

14. The frozen confection dispensing apparatus of claim 1 wherein the user interface includes control and calibration screens allowing adjustment of the parameters of the dispensing apparatus.

15. The frozen confection dispensing apparatus of claim 1 wherein the user interface includes graphical icons of flavors.

16. The frozen confection dispensing apparatus of claim 15 wherein the stepper motor varies the timing at an initiation of a dispensing cycle wherein base product flow is delayed a predetermined amount of time to allow for a pre-injection of a selected flavor syrup into the mixing cylinder prior to initiation of the base product flow such that the product dispensed at the start of the cycle is homogeneous.

17. The frozen confection dispensing apparatus of claim 15 wherein the stepper motor varies product flow at an end of the dispensing cycle such that the syrup flow is terminated for a predetermined amount of time while the base product is allowed to flow eliminating potential carryover.

18. A frozen confection dispensing apparatus comprising:
a freezer section including a base product;
a dispensing section connected to the freezer section, the dispensing section including a mixing cylinder and a plunger movably positioned within the mixing cylinder, the mixing cylinder including at least one injection port;
a plurality of flavor syrups linked with a syrup pump and connected to the at least one injection port;
a stepper motor connected to the plunger and moving the plunger within the mixing cylinder;
a control mechanism connected with the stepper motor and syrup pump selectively moving the plunger wherein a syrup dispense rate and timing is sequenced by the control mechanism with the stepper motor driven plunger wherein mixing of the base product and flavor syrup within the mixing cylinder is precisely controlled.

19. A frozen confection dispensing apparatus comprising:
a freezer section including a base product;
a dispensing section connected to the freezer section, the dispensing section including a mixing cylinder and a plunger movably positioned within the mixing cylinder, the mixing cylinder including at least one injection port;
a plurality of flavor syrups linked with a syrup pump and connected to the at least one injection port;
a stepper motor connected to the plunger and moving the plunger within the mixing cylinder;
a control mechanism connected with the stepper motor and syrup pump selectively moving the plunger wherein a syrup dispense rate and timing is sequenced by the control mechanism with the stepper motor driven plunger wherein mixing of the base product and flavor syrup within the mixing cylinder is precisely controlled; and
wherein the dispensing mechanism includes an automated rinse structure having a retractable curtain coupled to a rinse motor that rotates the retractable curtain around the dispensing section.

20. The frozen confection dispensing apparatus of claim 19 including a water valve coupled to the mixing cylinder wherein water is introduced into the mixing cylinder during a rinse cycle flushing the mixing cylinder.

* * * * *